Sept. 19, 1944.  A. L. GRISÉ  2,358,635
HOSE HANDLING APPARATUS
Filed Jan. 29, 1942  3 Sheets-Sheet 1
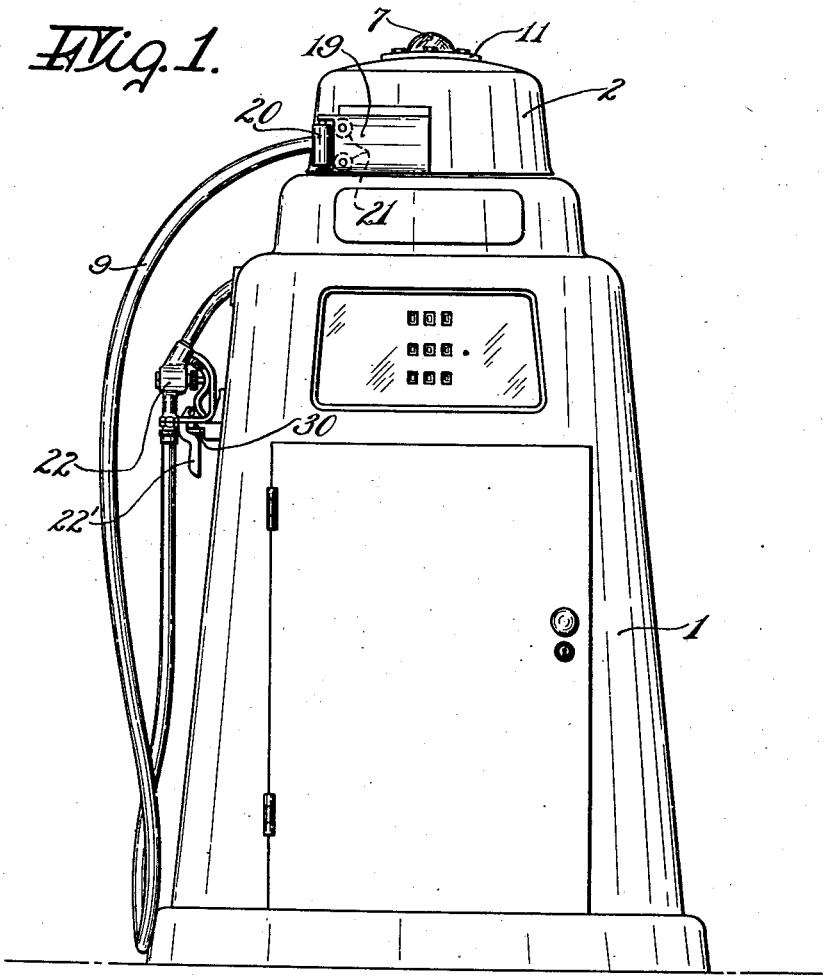
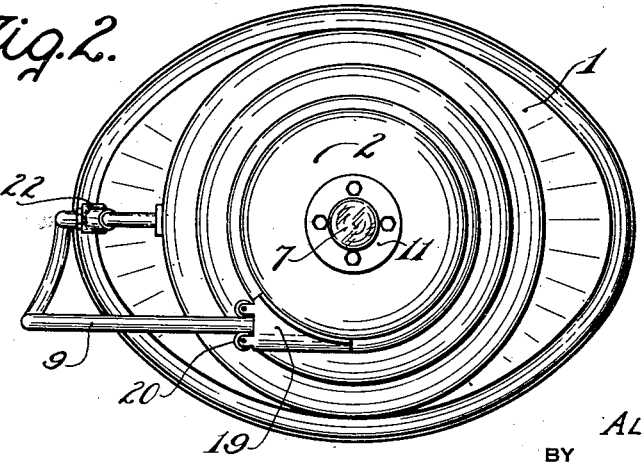
INVENTOR
ALFRED L. GRISÉ
BY
Chapin & Neal
ATTORNEYS Sept. 19, 1944. A. L. GRISÉ 2,358,635
HOSE HANDLING APPARATUS
Filed Jan. 29, 1942 3 Sheets-Sheet 2

INVENTOR
ALFRED L. GRISÉ
BY
Chapin + Neal
ATTORNEYS

Sept. 19, 1944.                A. L. GRISÉ                2,358,635
                        HOSE HANDLING APPARATUS
                         Filed Jan. 29, 1942           3 Sheets-Sheet 3
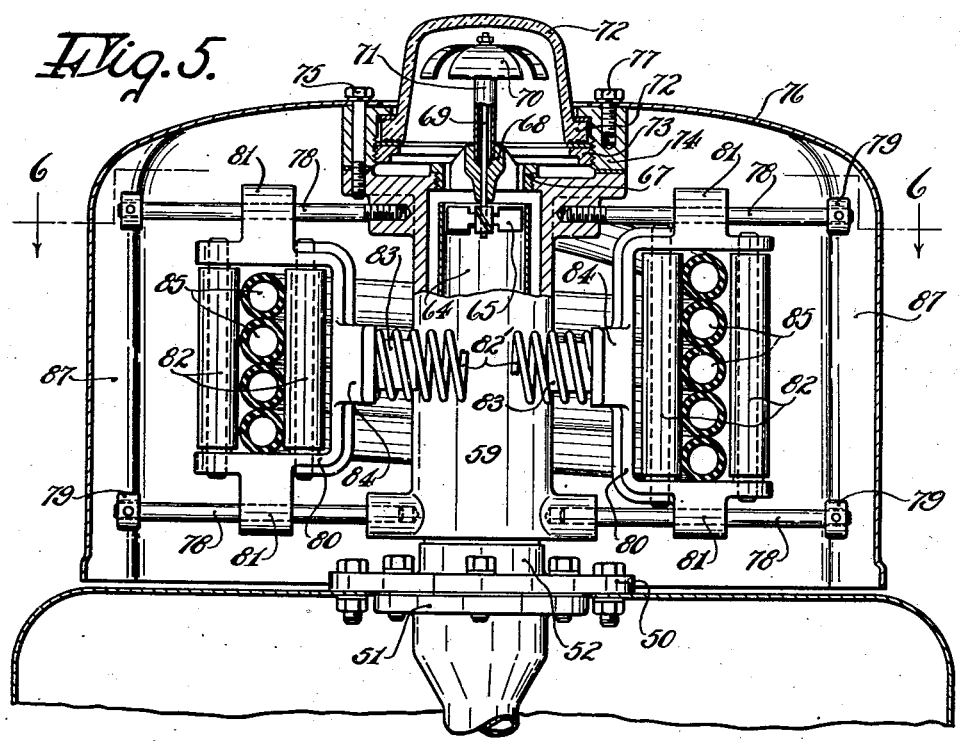
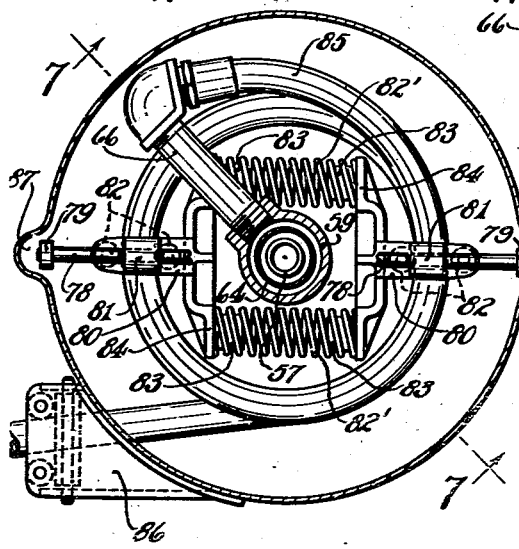
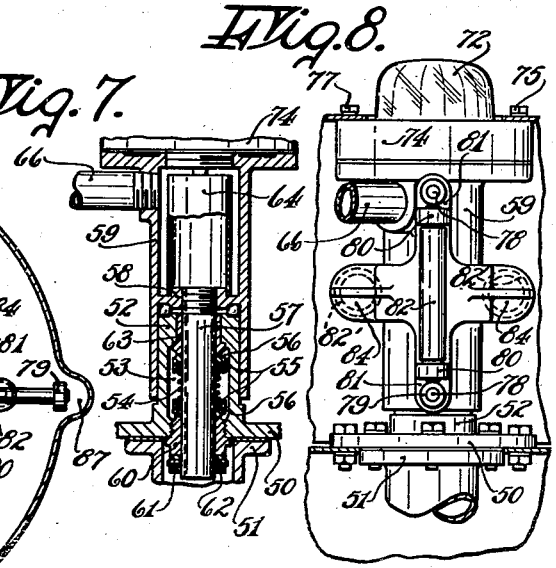
INVENTOR
ALFRED L. GRISÉ
BY
Chapin & Neal
ATTORNEYS Patented Sept. 19, 1944

2,358,635

UNITED STATES PATENT OFFICE 2,358,635

HOSE HANDLING APPARATUS

Alfred L. Grisé, Springfield, Mass., assignor to Gilbert & Barker Manufacturing Company, West Springfield, Mass., a corporation of Massachusetts Application January 29, 1942, Serial No. 428,653

11 Claims. (Cl. 299—77)

This invention relates to hose handling apparatus. It is particularly adapted for use at automobile filling stations. I disclose the apparatus and illustrate its use as attached to a gasoline pump.

From the accompanying drawings and following description the way to practice the invention will be clear. Its main features will be referred to and appreciated in the specific example illustrated.

In the drawings—

Fig. 1 is a front view of a gasoline pump with the hose handling apparatus built therein, the whole appearing as seen at a filling station ready for use;

Fig. 2 is a top view;

Fig. 5 is a view similar to Fig. 3 but showing a modification;

Fig. 6 is a section on 6—6 of Fig. 5;

Fig. 7 is a section on 7—7 of Fig. 5; and

Fig. 8 is an end elevation of the parts inside the covering canopy of Fig. 5 but with the hose omitted. In this view the top of the visi-gauge which normally shows above the canopy is included.

Figs. 1 and 2 show the pump casing 1. The casing 2 for the hose handling apparatus is arranged in turret top form on the top of casing 1. These two casings are thus combined to appear to the eye as one. It gives a simple, attractive, streamlined appearance. Fig. 2 indicates the casing 1 as oval and casing 2 as round in horizontal cross-section. It also indicates how these two forms blend nicely in appearance.

All the desired elements of a gasoline dispensing pump are assembled in casing 1 except the hose handling apparatus. This apparatus is assembled in the turrent top or casing 2. This casing 2 is not merely a casing; it is also an operative part of the hose handling apparatus.

Figure 3:
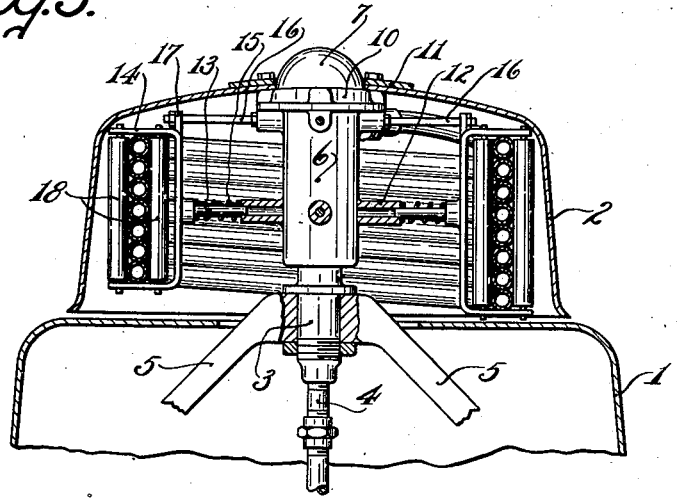
Fig. 3 is a side view of the hose handling apparatus per se, with some parts in section.

This apparatus, as seen in Fig. 3, is mounted to rotate as a unit with a bearing on fixed part or cylinder 3. The latter is a fixed cylinder mounted on the end of pump discharge pipe 4. This pipe ends at the top and centrally of casing 1. It empties into cylinder 3. Suitable braces, indicated at 5 and connected to the pump frame, help support the weight of the hose handling apparatus. A bearing, not shown in Fig. 3, is arranged between cylinder 3 and the rotatable head 6. It may be any type of fluid-tight bearing, preferably a ground and packed joint arranged to support weight. The head 6 is a cored casting with passage for liquid from cylinder 3 to visigauge 7 and from the latter to exit opening 8. Here the hose 9 is connected to head 6. The cover plate 10, having a dome-shaped glass cap therein, is the top portion of head 6. The cap serves as a visi-gauge by having the flow pass into the glass cap from head 6. Figs. 5 and 7 of the modification of the invention show details of the preferred construction of cylinder 3, rotatable head 6, and visi-gauge 7. It is desired that this preferred visi-gauge construction be used in both modifications.

The turret head casing 2 is supported centrally by overlapping it onto the upper flange of cover plate 10. An apron plate 11, seen in Fig. 1, is then bolted down with the same bolts as used to fasten the cover plate to the top of head 6. Casing 2 is in the form of a canopy, to protect all the hose handling apparatus, except the outside hose portion.

Inside the canopy there is an expansible and contractible frame to support a substantial length of hose. This frame consists of four cylinders 12 integral with head 6 and extending radially. Each one has the shank 13 of a yoke holder 14, slidably mounted. A spring 15 for each holder 14 yieldingly holds the latter in outermost position. Overlying each of these radial arrangements, of spring-pressed supports, is a guide rod 16, passing through an upstanding ear 17 on the yoke holder 14. A nut on one end of such rod acts as a stop. The rod, being firmly held at the other end by its mounting in head 6, also acts as a helping rod support for the yoke. Vertically mounted in each yoke holder 14 are two vertically mounted anti-friction rollers 18.

Figure 4:
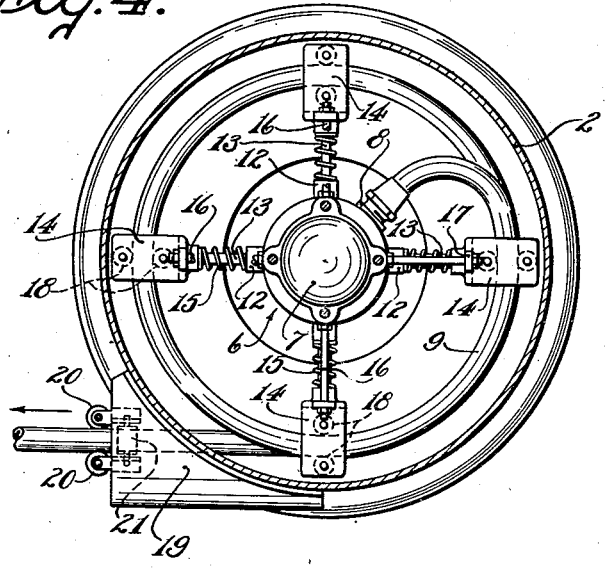
Fig. 4 is a top view of parts in Fig. 3, with some portions appearing which are cut away in Fig. 3.

With the arrangement described the hose extends from its connection discharge opening 8 of head 6, Fig. 4, into one after the other of the yoke holders 14, between the rollers 18. The hose is coiled seven times in the example shown. Then it extends tangentially of the coils to pass outside the canopy through a shielded or covered opening 19. Adjacent each side of such opening two vertical anti-friction rollers 20 are mounted (see Fig. 4). Adjacent these rollers the hose passes between two horizontally arranged guide rollers 21, see Fig. 4. Then the hose normally extends to a hand dispensing nozzle 22 at its end, as in Fig. 1.

As shown in Fig. 1, the outside hose portion hangs from the turret top into a long loop outside the pump casing. The nozzle is hung on a hook 30 adjacent a pump switch handle 22'. In such position the nozzle is available, after the switch handle is turned, to be taken off the hook and carried to the delivery point. Such hook, nozzle, and switch construction is well known. So it is here merely indicated.

I have thus provided a long hose loop to be seen outside the casing where it is ready for use. Its length is conveniently some ten feet more or less. I prefer to thus arrange the outside hose portion for neat hanging appearance at the pump. This is enough for the attendant to serve at customary stopping points of his customers. It invites them to come within reach of the length of displayed hose. When occasionally this length is miscalculated, an extra length of hose may be withdrawn from the turrent top to serve such a customer. This general plan, but without the convenience of the turret top function, is disclosed in the Hope Patent No. 2,225,271, granted December 17, 1940. In the preferred form of my invention I desire to retain the advantages that the prior general plan has and provide other advantages.

In the normal operation of the pump indicated in Fig. 1 there is this advantage: The attendant may carry the hose nozzle around the pump 360°. In doing so the displayed or outside hose portion may be moved bodily—the inner as well as the outer end. This occurs because the turret top rotates by a slight circumferential hose pull. So the outside length of hose will reach just as far for dispensing, no matter on what radius the desired dispensing point may be.

There is this added advantage: if the desired dispensing point happens to be beyond the outside hose length, it may be extended by pulling out extra length from the portion in the turret top, according to the mechanical operation of the mechanism in said turret top.

Referring now to Fig. 4, the pull for extra hose length may always be along the line of the arrow. This is always substantially tangent to the coils of hose because the turret top and its casing 2 will turn to present this line for the hose pull and before extra hose length can be pulled out of casing 2.

As the hose is pulled tangentially of the stored coils the latter are put under tension. This acts to compress the springs of the frame supporting the coils. The action contracts the diameter of the coils. Their number remains the same but their diameter is lessened. Thus, a little more hose may be drawn out to extend the delivery point.

It should be noted that as the extra hose length is drawn out of the turret head, the latter does not rotate. With this structure and mode of operation, the extra hose length is very conveniently and efficiently kept stored, ready for easy use. The hose handling apparatus is inexpensive to make, install, and keep in operable condition. The storage means per se, i. e., the expansible and contractible frame, operates in principle as a circular festooning device. The loops merely change their dimensions as tension is applied to give out length, and tension is released to take up length. The springs 15 cause the taking up of length. In the form shown, the hose handling apparatus is an exceedingly compact device. This renders it particularly useful as a hose handling apparatus for filling station dispensing units.

Of course the illustration in the drawings of Figs. 1 to 4 and the specific example given in them may be varied while retaining important features of invention. If it be desired to store substantially all hose inside, the number of coils on the frame may be increased and the length outside the casing reduced to an amount sufficient for a mere nozzle connection.

In Figs. 5 and 6 the hose is assumed to be under tension. The hose supporting frames, therefore, are shown in a position intermediate of the inner and outer extreme positions.

In Figs. 5 to 8 I have shown a modified construction which retains features of invention already described, and discloses other features of advantage. This modification is the one I prefer as the best specific means known to me for putting my invention into use. This choice has reference to the invention in its broad as well as in its specific features.

Here, as before, I show the hose handling apparatus arranged in horizontal position. It might be arranged vertically and for use with other liquid supply means than a gasoline dispensing pump. It is useful in various associations for the efficient handling of flexible hose.

As shown, the flange 50 is fastened to flange 51 of the supply pipe. The supporting head consists of the chamber casting 52. It provides the chamber 53 (Fig. 7), in which spring 54 presses packings 55 in cups 56 to seal pipe 57. The latter is threaded into web 58 of chambered casting 59. Ball bearings support said web on the top of casting 52, which latter casting is telescoped into casting 59. Pipe 57 at the bottom has a bearing in plug 60 threaded in casting 52. The bottom end of pipe 57 carries a sleeve 61 fastened on by threaded pins 62. The sleeve provides a suitable bearing metal for the bottom of the pipe in the manner shown where it rotates on the bottom of said plug 60. The pipe is also rotatably mounted in bearing sleeve 63 lining casting 52 at the outlet. This detail arrangement makes an efficient slip joint between the supporting and the rotatable castings, with a fluid-tight passage by said pipe and packed against leaking. The top casting has a sturdy support for its anti-friction rotation. Thus, a rotatable head is arranged to which the fluid from the supply line is efficiently fed. The feed is through pipe 57 which rotates with casting 59.

In this casting there is a cylinder 64 to cause liquid flow to the top and then only to the annular space between the cylinder and casting. The arrangement shown is to cause the turning of the spinner member 65. This is part of the visi-gauge construction. The liquid flows out of casting 59 through pipe 66 and this is connected to the hose, as will be described.

The visi-gauge construction, see Fig. 5, is made up of the following parts: A sleeve 67 carrying bearing 68, by a spider connection, is screwed into the top opening of casting 59. Rod 69, with spinner 65 fastened at the bottom and the inverted split cup 70 fastened at the top end, rotates in bearing 68. The sleeve 71 mounted in the top of bearing 68 is spaced from the rod. Its upper end provides a bearing support for cup 70 to ride upon. The slightest liquid movement will cause the spinner and cup to rotate. This rotation is visible through the inverted glass cap 72, this being the topmost part of the apparatus. If it is full and seen to be so, then any movement of the visi-gauge part 70 will indicate the desired liquid movement to the hose.

A flange on cap 72 is packed against a retaining ring 73 screwed into a flange ring 74. The latter bears against a packing on top of the flange on cap 72. This flange ring 74 is also packed against the supporting flange of casting 59, being also bolted to said casing at spaced points as at 75.

The flange ring 74 also supports turret casing or canopy 76. The latter is fastened to the ring by screws at spaced points as at 77.

Thus, the casting 59, being rotatably mounted, carries for rotation all parts described as being fastened to such casting. Thus, the visi-gauge construction, turret top, or canopy, and the outlet pipe 66 leading to the hose from the casting 59, all move together when one moves.

The same casting 59 also carries the hose supporting frame.

In this embodiment the frame consists of fewer parts. They are all mounted from the main supporting casting 59. To this are fastened two oppositely arranged pairs of radial rods 78. They are adjustable. Adjustable stops 79 are fastened at the outer ends. On each pair of rods a U-frame 80 is mounted, to slide on the rods and be guided through ears 81. A pair of rollers 82 is mounted in each frame 80. A pair of coiled springs 82' is mounted between frames 80. They are held on by their end coils engaging bosses 83 on spring saddles 84 fastened to frames 80. Their operation is such as to normally hold frames 80 wide apart with ears 81 engaging stops 79. As before stated, the frames in Figs. 5 and 6 are shown between their extreme positions.

The dispensing hose 85 is here shown extending from an angle pipe union on the outer end of pipe 66, into four coils between rollers 82. The arc of the hose coils between the two frames 80 will be 180°. The hose material of rubber or its equivalent will have sufficient resiliency or spring to retain such arc without other support. The diametrically opposed frames 80 will give support enough for these coils. The lower hose coil connects with a tangential hose portion extending outside the turret top or canopy through hood 86. This hood has pairs of anti-friction rollers mounted to movably support the hose through the hood. The outside hose portion carries the dispensing nozzle at the end. I have described it generally above and the manner of handling the outside hose portion.

One advantage of the modification of the turret top mechanism just described is that the hose coils will loosen up more length of hose inside the turret with given hose storage dimensions than in the first modification. The arrangement is easily seen to be one of a circular festooning device. In it the springs spread the hose coil supports outwardly in their canopy when there is no tension. The springs yield to lessen the coil diameter when there is tension on the hose. Thus, the hose may be drawn out of the canopy by the action of the festooning device. I have shown the bulges 87 (Fig. 6) in the wall of the canopy to provide for greater movement without making the whole canopy wall of equal diameter. This is a detail. It relates to the desire to keep the canopy dimensions low. Otherwise, the hose storage space provided might by oversize detract from the apparatus appearance.

A comparison of the last described form of my invention with the first described one will show a simplification of structure. The two taken together will show that the specific structure may be varied while the broader features of invention are retained in different specific forms.

I claim:

1. A hose handling apparatus including a dispensing hose, a fluid supply head to which the inner end of the hose connects, a frame having an expansible and contractible periphery around which a substantial portion of the hose is arranged in circular loops, means adapted by contact with the outside of said loops to maintain the same number of such loops on the frame at all times yielding means in the frame to normally hold its periphery as well as the hose loops thereon at a predetermined and expanded diameter, a portion of the hose extending outwardly from the frame for the attendant to grasp and carry, said means yielding so as to decrease the diameter of said frame periphery and its circular loops whenever the attendant puts the hose under tension whereby a hose portion normally carried by the frame is supplied for the attendant to carry for a distant point of hose delivery, said hose-carrying frame being non-rotatably mounted with respect to said fluid supply head.

2. A hose handling apparatus having in combination a rotatable discharge head for connection to a fluid supply line, a flexible hose with its inner end connected to said head, a frame carried by said head and rotatable therewith, said frame having an expansible and contractible periphery adapted to carry a plurality of hose coils spaced from the head, the inner portion of said hose passing from the discharge head into several coils on the periphery of the frame and then away from the frame into an outer hose portion for hand manipulation, means on the frame to make contact with the outside of the hose coils and prevent them from unwinding sufficiently to lessen the number of coils, yielding means normally tending to hold said periphery and hose coils in outwardly expanded position but operable to contract when the outer portion of the hose is tensioned and pulled toward a desired point of hose delivery, whereby length of hose is added to said outer hose portion from the hose portion that is normally kept on the frame in expanded coils, the decreasing diameter of such coils on the frame releasing such extra length of hose from the frame when the hose is pulled out under tension, the mode of operation being carried on without decreasing the number of coils on the frame but only their circumference.

3. A hose handling apparatus, in combination a dispensing hose, a fluid discharge mechanism for connecting the inner end of the hose to the supply line of a dispensing apparatus, said mechanism including a rotatable support and a turret to which the hose end is connected, a frame with an expansible and contractible periphery surrounding said turret, the frame and its periphery being carried for rotation with but not in respect to said turret, a canopy carried by the turret to enclose said frame, said hose being coiled several times around said periphery, means on the frame to make contact with the outside of the hose coils and prevent them from unwinding sufficiently to lessen the number of coils, yielding means in the frame whereby tension through the hose coils will decrease their diameter, said hose beyond the coils passing through the side of said canopy into a delivery portion.

4. In a dispensing apparatus for gasoline and other fluids delivered at filling stations, in combination a casing for the main part of the apparatus, and a superstructure on top of the casing, said superstructure being in the form of a turret top constructed as a hose handling apparatus characterized by the following mechanism, a turret support connected with the supply line of the dispensing apparatus, a rotatable extension of such support, a dispensing hose with inner end connected through the extension, an expansible and contractible frame for different diameters adapted to hold hose loops, said frame being mounted on and rotatable with the extension, a canopy likewise mounted on the extension, said hose being coiled several times around said frame and then extending through the canopy wall to form an outside length for the attendant, yielding means operable by pulling and releasing said outside hose length to contract and expand said frame respectively, said hose and turret with its frame being movable as a unit around said turret support and the main dispensing casing by the attendant without affecting the diameter of the hose coils on the frame until and unless he pulls on the outside portion of the hose as by acting to extend it.

5. A hose handling apparatus comprising a turret, a hose-carrying frame mounted on but against rotation with respect to the turret, a hose having its supply end connected to the turret and coiled on the frame, the arrangement permitting the end of the hose and the coiled portions on the frame to rotate as a unit, a canopy cover also carried by the turret, said hose beyond the coils passing through the canopy cover to an outside portion, the latter acting when carried by the attendant in an arc to move the other parts as a unit in circular movement, a support for said turret and a supply line to the hose through the turret having a slip joint associated with said support, yielding expanding power means in said frame adapted for operation to expand and contract its periphery and thus the diameter of said coils upon pulling and releasing respectively on said hose from its portion beyond said coils whereby the hose portion released by a decreasing diameter may extend the outside hose length and such length may upon an increasing diameter be taken up by said power expanding means.

6. A hose handling apparatus comprising a liquid supply means having a bearing, a rotatable header member connected to the supply means and mounted on said bearing, a contractible and expansible hose supporting frame carried by said header member and with springs for normally holding the frame expanded, a long hose having its inner end connected with said header member, extending into several coils on said frame, and then extending tangentially of said coils into an uncoiled hose manipulating portion, said hose being of sufficiently resilient material to maintain a coiled form of a diameter about equal to the overall dimension of said frame, means adapted by contact with the outside of the hose coils to prevent their unwinding upon rotation of said frame, said frame having hose contacting portions arranged substantially in one single plane and spaced 180° apart with respect to said coils, whereby the coils between such portions are suspended, such hose handling apparatus being operable by manipulation of the outer hose portion to supply or take up extra hose length in said portion according to the mode of operation described.

7. In a hose handling construction, the combination of a hose arranged in a series of coils, a rotatably mounted header member positioned centrally of said coils and adapted to supply liquid to said hose with which it is connected, a generally rectangular frame having rollers mounted therein forming the outer sides, said frame being supported by said header member to move with it, spring means to yieldingly hold contact between said rollers and the inside of said hose coils, rollers carried by the frame in contact with the outside of said coils to prevent their unwinding into a fewer number of coils, said hose having an outer portion extending tangentially away from the coiled portion for hand manipulation according to the mode of operation described whereby without rotating the frame the outer hose portion may be increased by hose tension applied by hand and such increase taken up automatically by said spring action when such hose tension is released.

8. A hose handling apparatus adapted for use with liquid dispensing apparatus, the combination of a liquid supply line, a rotatable supporting head having a fluid-tight connection for the supply line, a hose frame mounted to rotate with said head, said frame having spring pressed hose coil supporting means for normally holding hose coils expanded, devices rotatable with said frame and in contact with the outside of the coils to prevent their unwinding from said frame, said frame arranged to contact the hose coils at opposite sides so as to leave the coils suspended between said contacted portions whereby a resilient hose may normally maintain its coil form for as much as 180°, the frame being adapted to contract and expand when the hose is placed under tension and released, all without decreasing or increasing the number of coils on said frame.

9. A hose handling apparatus for use in liquid dispensing apparatus, the combination of a rotatable liquid supply header member adapted for mounting in fluid-tight relation to a liquid supply line, a pair of frames arranged in the same plane on opposite sides of said head, means to guide and support said frames for radial movement with respect to said header member, springs arranged between said frames to normally hold them in outermost positions, said springs straddling said header member, a hose coiled about said header member and supported by said frames, said hose having sufficient resiliency to maintain the coiled form in any position of said frames, means adapted by contact with the outside of the coils in said hose to maintain the coiled hose form on said support for changes in diameter but not in number of coils, a canopy adapted to cover said hose coils, said hose having a portion extending outside said canopy to manipulate the coils therein.

10. A hose handling apparatus, a canopy for covering hose coils, a depending turret head depending centrally of the canopy, radial supports carried by the turret head, oppositely arranged frames movable on said supports, springs arranged on opposite sides of said head and mounted to normally hold said supports outwardly, a hose connected at one end with the interior of said turret head, coiled a given number of times around said supports and then passing outside said canopy into an uncoiled dispensing portion, means in contact with the outside of the coils to hold the same number of coils on said supports for contraction and expansion of their diameter but against uncoiling, said outside hose portion being adapted to swing the turret head, contract said springs to lessen the diameter of the hose coils, and said springs being adapted upon release of the outside hose portion to increase said diameter, all without uncoiling said coils within the said canopy.

11. A hose handling apparatus comprising an upstanding cylindrical turret head, means to mount it for fluid-tight supporting rotation on a liquid supply line, means including a transparent visigauge cap to close the top of said turret head and a canopy of substantial size to rotate with said head, expansible and contractible hose coil supporting means mounted on said head to rotate therewith, a hose connected to receive its supply from said head, mounted in coils on said hose coil supporting means and having a portion extending outside said canopy, all constructed for the mode of operation described.

ALFRED L. GRISÉ.